United States Patent [19]
Hamilton

[11] 3,845,971
[45] Nov. 5, 1974

[54] RESTRAINT METAL CHIP COOLANT AND SEPARATOR

[75] Inventor: Brian K. Hamilton, Utica, Mich.

[73] Assignee: Allied Chemical Corporation, New York, N.Y.

[22] Filed: Dec. 15, 1972

[21] Appl. No.: 315,700

[52] U.S. Cl. .............. 280/150 AB, 55/267, 55/512
[51] Int. Cl. .............................................. B60r 21/08
[58] Field of Search ......................... 55/267–269, 55/473, 385, 512, 372, DIG. 30; 23/281; 165/10; 280/150 AB

[56] References Cited
UNITED STATES PATENTS

| | | | |
|---|---|---|---|
| 1,762,320 | 6/1930 | Wood | 165/10 |
| 1,815,570 | 7/1931 | Jones | 165/185 |
| 2,323,895 | 7/1943 | Buttner | 165/185 |
| 3,690,695 | 9/1972 | Jones, Sr. | 280/150 AB |
| 3,733,180 | 5/1973 | Heineck et al. | 23/281 |

Primary Examiner—Bernard Nozick
Attorney, Agent, or Firm—Jonathan Plaut; John P. Kirby, Jr.

[57] ABSTRACT

A metal chip coolant and separator bed for an inflatable restraint passenger restraint system for automobiles is provided between a supply of gas and the inflatable restraint. In one embodiment the bed is between a pyrotechnic gas supply and the restraint for cooling and filtering the gas of impurities.

4 Claims, 3 Drawing Figures

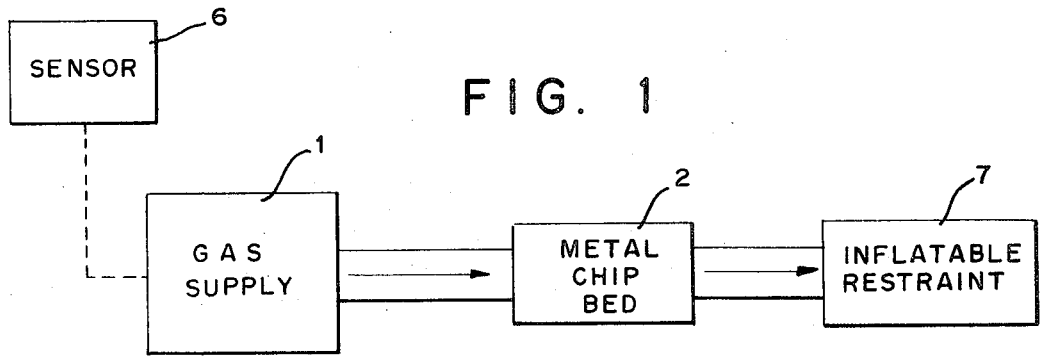
FIG. 1
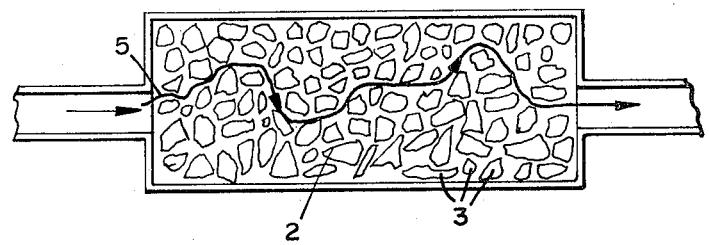
FIG. 2
FIG. 3
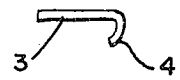

RESTRAINT METAL CHIP COOLANT AND SEPARATOR

BACKGROUND

Automobile passenger restraint systems may include an inflatable restraint that restrains a passenger during the critical instant of a collision impact. For safe and successful use the restraint must be inflated in a very short time at a controlled rate and thereafter deflated to release the passenger. The gas used to inflate the restraint must be cool enough to avoid damage to the restraint or injury to the passenger. For similar reasons it is important that hot or high velocity dust or other impurity particles do not reach the interior of the restraint.

Two approaches have been employed for obtaining gas for inflating the restraint in a passenger restraint system. In one of these a pressurized gas is contained in a pressure-resistant container. When the system is activated the container is rapidly opened letting the gas flow into the restraint. Typically, explosive devices have been used to rupture a portion of the container in order to release a sufficient quantity of gas in a short time. Explosive devices may send shrapnel along with the gases. The rapid expansion of gas causes great cooling, thereby increasing the weight of gas needed for inflation.

Another approach has been to use pyrotechnic mixtures which burn or decompose upon ignition to yield hot gases that flow to the inflatable restraint. Some such systems have gases that are too hot for practical operation. Some devices have been built using both pressurized gases and pyrotechnic gas generators with the hot and cold gases mixed for injection into the restraint. This can alleviate the temperature problem but significantly increases the complexity, cost, volume, and weight of the system.

Other problems in an inflatable passenger restraint system may include heat carrying shrapnel, dust and other impurities from the gas generating system entering the inflatable restraint, with possible damage to the restraint or injury to the passenger.

SUMMARY OF THE INVENTION

There is therefore provided in practice of this invention according to a presently preferred embodiment an improved passenger restraint system having a coolant and separator bed of metal chips between its gas supply system and the inflatable restraint through which substantially all of the inflating gas passes for heat transfer and filtering. In one advantageous and preferred embodiment, at least a substantial number of the metal chips have a curl or section thereof lying in a separate plane to separate the chips and provide gas flow paths in the bed.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates a schematic flow according to the invention;

FIG. 2 is a detail of FIG. 1; and

FIG. 3 shows a detail of a chip.

DESCRIPTION

As may be seen in FIGS. 1-3, a source of gas supply 1 supplies inflating gas to an inflatable restraint 2, as disclosed, for illustrative purposes only, in U.S. Pat. No. 3,682,498. At least a portion of the inflating gas supplied from the source of supply 1 to the inflatable restraint 7 passes through a bed 2 of metal chips which act as a coolant and impurity separator for the gas.

In one operative embodiment, the gas supply 1 may be a stored gas, or a generated gas (for example, generated from black powder which burns to produce the gas) or a combination of the two. In one illustrative embodiment, gas is supplied from the gas supply 1 on indication of the sensor device 6 that the vehicle which embodies the gas supply and inflatable restraint is undergoing accident condition. The sensor may be of any well known type, such as, for example, that sensor disclosed in U.S. Pat. No. 3,688,063 granted Aug. 29, 1972.

The metal chips, preferably in one embodiment made of steel, are loaded into the bed 2 such that gas passing therethrough will take an irregular path in passing toward the inflatable restraint 7. That irregular path is shown, for example, in phantom 5. The chips loaded in the bed 2 are obviously adjacent one another in three dimensions, but they may be advantageously held apart by providing a curl 4, that is, a portion thereof in a plane distinct from the plane of the substantial portion of the chip. The irregular shape of the chip, as well as the holding of a substantial number of chips away from other chips by use of the curl, provides for maximum gas contact with the chips to allow for cooling of the gas and catching by the chips of impurities such as dust in the gas. Not all of the chips are anticipated as necessarily having the curl as described; but a substantial portion of the metal chips, for example, more than 10% and preferably more than 50 percent for maximum separation and effectiveness should have a portion in the second plane for maximum effectiveness. Steel is preferable for the metal selected for the chips in view of its excellent heat absorption characteristics, without contributing dust or other impurities of its own.

When the system is actuated, gas is released from the gas supply system and flows through the pipe into the interior of the porous metal chip coolant and separator bed 2. The porosity of the bed 2 is such that it has a larger flow cross-section through the porous material than the pipe leading to it. The gas passes through the spaces between the chips 3 (as in the path 5 shown in phantom) and hence enters the restraint after passing over a large and irregular surface of metal chips for minimizing the possibility of damages to the restraint due to gas impingement, for maximum cooling and impurity collection, as discussed. The curl previously discussed allows the chips to be held apart in the bed to provide paths of flow for the gas.

It is found that with such an arrangement many substantial advantages are obtained. Tearing of the bag due to direct gas impingement is effectively eliminated. The porous bed further serves to trap any hot particles or other shrapnel which may be traveling with the gas, thereby avoiding damage to the bag and possible injury to a passenger. The gas passing around the metal chips is in excellent heat transfer medium so that hot gases are advantageously cooled by an amount that is readily controlled by the total heat capacity of the bed while the irregular surface of the chips catch dust and other impurities otherwise heading for the restraint.

In an advantageous embodiment the porous bed is made of steel chips which may be in one typical embodiment generally square but irregular in shape and about 0.10 inch by 0.10 inch, and incorporating a curl to provide the separation between chips, and a thickness of about 0.010 inch.

Although the porous metal chip coolant and separator bed has been described with relation to a specific embodiment herein, many modifications and variations will be apparent to one skilled in the art and it is therefore to be understood, that within the scope of the appended claims, the invention may be practiced otherwise than specifically described.

What is claimed is:

1. In an improved inflatable restraint system comprising a gas supply system, an inflatable restraint, and means connecting said gas supply system and said restraint for conveying gas therebetween for inflating said restraint, the improvement comprising a porous coolant and separator bed comprising metal chips maintained in said connecting means between the gas supply system and the inflatable restraint through which at least a portion of the gas passes, at least a substantial portion of the metal chips being generally flat and lying in a first plane and having a portion thereof in a second plane extending from and distinct from the first plane.

2. In an improved restraint system as defined in claim 1, wherein the portion in a second plane is a curl extending from the first plane.

3. In an improved restraint system as defined in claim 1, wherein said substantial portion equals at least about 50 percent.

4. In an improved restraint system as defined in claim 3, wherein the chips are steel.

* * * * *